Oct. 16, 1962     H. J. TYLER     3,059,084
ELECTRIC THERMOSTAT

Filed Aug. 11, 1958     3 Sheets-Sheet 1

Oct. 16, 1962  H. J. TYLER  3,059,084
ELECTRIC THERMOSTAT
Filed Aug. 11, 1958  3 Sheets-Sheet 2

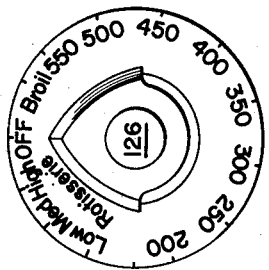
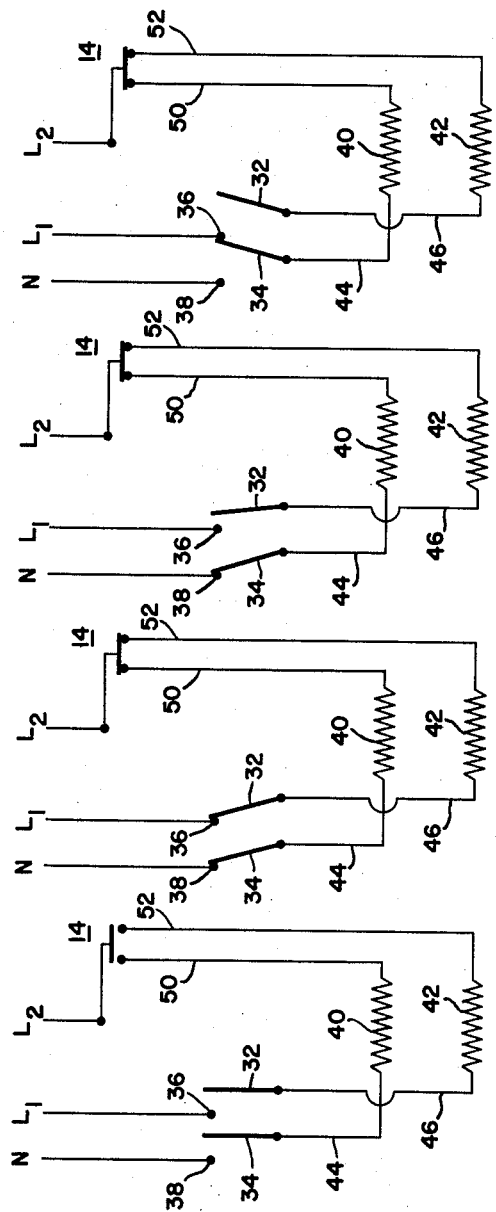

United States Patent Office 3,059,084
Patented Oct. 16, 1962

3,059,084
ELECTRIC THERMOSTAT
Hugh J. Tyler, Jeanette, Pa., assignor to Robertshaw-Fulton Controls Company, Richmond, Va., a corporation of Delaware
Filed Aug. 11, 1958, Ser. No. 754,208
8 Claims. (Cl. 219—20)

This invention relates generally to thermostatic control switches and more particularly to control switches for electrically heated ovens provided with baking and broiling elements.

At the present time, electrically heated ovens are usually provided with at least one switch for the thermostatic control of the broil and bake elements. With the usual type of switches presently on the market, a variety of heating operations may be performed and may include energization of the broiling element at full voltage to perform a broiling operation, and energization of the broiling element at reduced voltage while the baking element is energized with full voltage to give top heat control during the baking operation. When a rotisserie is included in ovens of this character, separate energization of the broiling element at a reduced voltage is usually required. Accordingly, a separate switching means is required because the usual type of switch for controlling the baking and broiling elements is incapable of energizing the broiling element at the reduced voltage while performing its other intended controlling operations.

Furthermore, it has been the practice in thermostatically controlled switches of this type to provide an Off position and a plurality of controlling positions with the temperature setting means of the thermostatic switch being rotatable in a clockwise direction from the Off position to one of a plurality of controlling positions. The lower temperature settings of these switches have been provided nearest to the Off position on the temperature setting means and the higher temperature positions of the switch have been located most remote to the Off position thereof. Although the operation achieved by these prior art devices has been for the most part satisfactory, there is no apparent need for this unnecessary movement of the temperature setting means through greater distances than is actually required to position the switch parts to their proper operative positions. It is thus an object of the present invention to utilize switch parts of a thermostatic switch common to both heating elements in a flexible arrangement for securing desired temperature changes in heating arrangements.

Another object of this invention is to position switch parts of the thermostatic switch to any desired heating arrangement by rotation of temperature setting means through not more than 180°.

A further object of this invention is to retain the broil and top heat baking operations of prior thermostatic control while adding thereto rotisserie operation.

This invention has a further object to obtain any arrangement of heating elements at any temperature setting of the thermally responsive means of a thermostatic switch for any position of the temperature setting means thereof.

This invention has a still further object to calibrate the thermally responsive means of a thermostatic switch independently of its temperature setting means.

A further object of this invention is to adjust the temperature setting of a thermostatic switch without disturbing the calibration setting thereof.

Another object of this invention is to mount a thermostat within a casing in a manner whereby its operation and calibration is uneffected by irregularities in the casing.

With these and other objects in view, the invention may take the form of a switch means movable between a plurality of positions for controlling a heating circuit and an energizing means operable between controlling positions for connecting the switch means to a source of electric power. Condition responsive means adjustable through a range of predetermined conditions are operative for operating the energizing means between controlling positions in response to variations in any of the preselected conditions and a control means which is rotatable to an infinite number of positions is operatively associated with the switch means and the condition responsive means for moving the switch means between the plurality of positions and the condition responsive means to any of the predetermined conditions. Such a construction has unique advantages in the economic manufacture of a thermostatic switch for by proper correlation of the control means, condition responsive means, and switch means any desired arrangement of heating circuit responsive to any predetermined condition of the condition responsive means can be obtained in any of the infinite number of positions of the control means.

These and other advantages will become apparent from the following description of one embodiment of the invention taken in connection with the accompanying drawings wherein:

FIG. 8 is a top view of a temperature setting dial which may be used with a thermostat of this invention;

FIG. 9 is a schematic view of a heating circuit with the switch of this invention shown in the "off" position;

FIG. 10 is a view similar to FIG. 9 with the switch in the "bake" position;

FIG. 11 is a view similar to FIG. 9 with the switch in a "rotisserie" position; and FIG. 12 is a view similar to FIG. 9 with the switch in the "broil" position.

Figure 1:
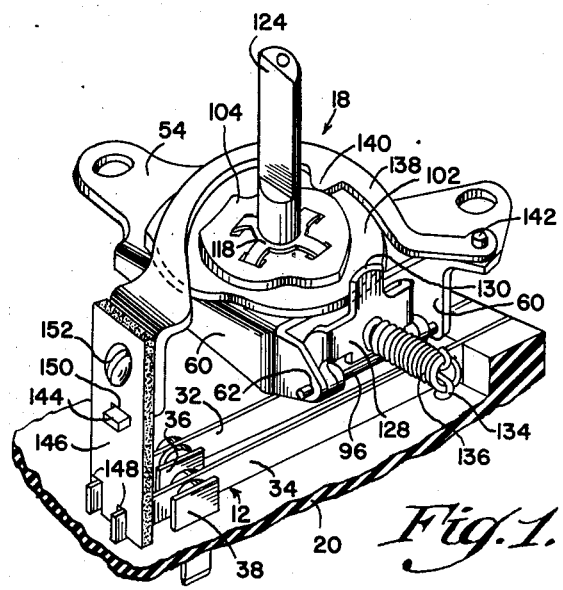
FIG. 1 is a partial perspective view of the thermostat of this invention.
Figure 2:
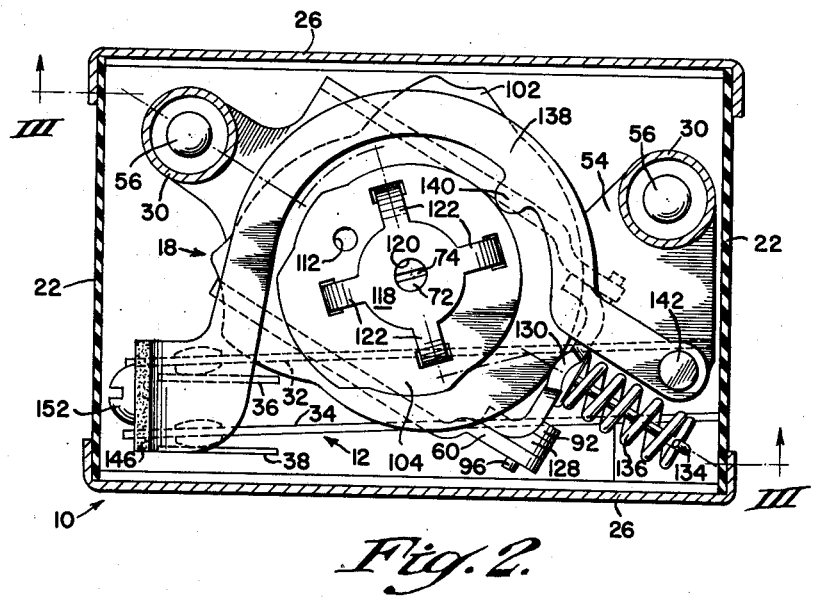
FIG. 2 is a partial sectional view of the thermostat of this invention taken on line II—II of FIG. 3.
Figure 3:
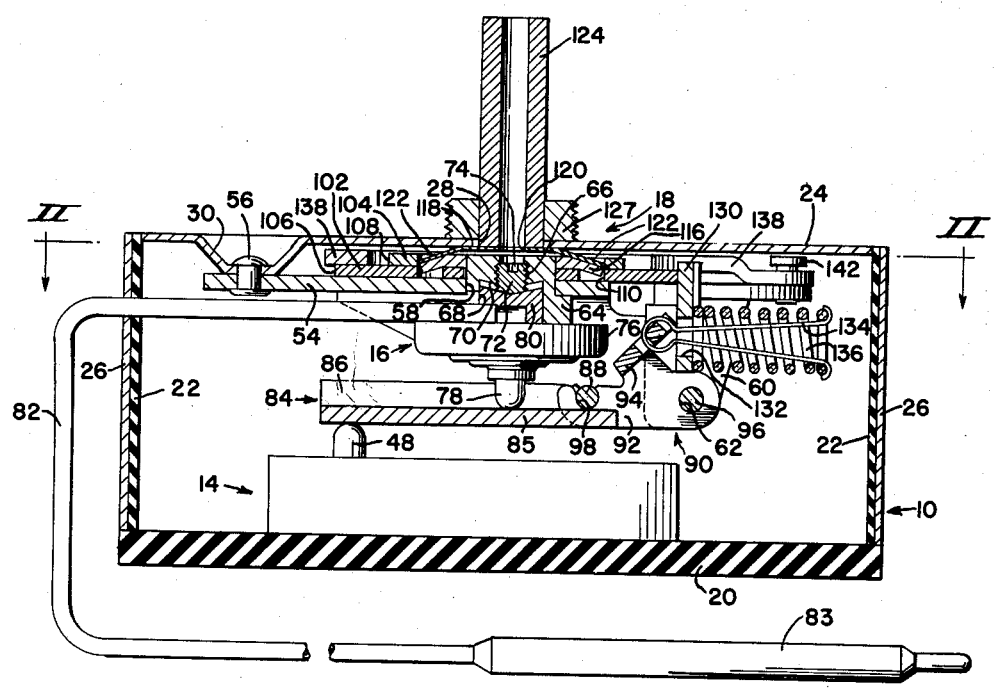
FIG. 3 is a view similar to FIG. 2 taken on line III—III of FIG. 2.
Figure 4:
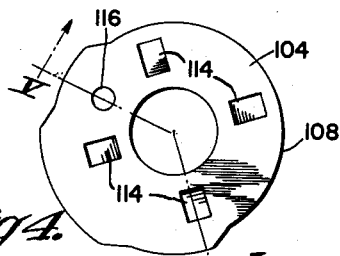
FIG. 4 is a plan view of one of the cam members shown in FIGS. 1 through 3.
Figure 5:
FIG. 5 is a sectional view taken on line V—V of FIG. 4.
Figure 6:
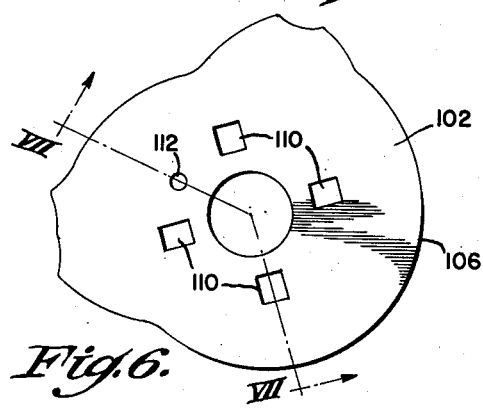
FIG. 6 is a view similar to FIG. 4 showing another of the cam members.
Figure 7:
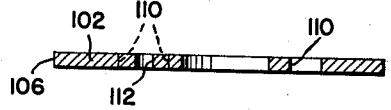
FIG. 7 is a sectional view taken on the line VII—VII of FIG. 6.

Referring to FIGS. 1 to 3, inclusive, the switch of the present invention is shown comprising a casing structure indicated generally at 10 which contains switch means indicated generally at 12, energizing means indicated generally at 14, condition responsive means indicated generally at 16, and a control means indicated generally at 18.

Casing structure 10 is shown comprising a generally U-shaped member which may be molded of an insulating material having a base portion 20 and plural upstanding end portion 22. Upstanding end portions 22 are cooperable with suitable apertures provided in a snap-on metallic cover member having a top portion 24 and flanged downwardly extending side portions 26. Top portion 24 is provided with a more or less centrally disposed aperture 28 and a plurality of suitably apertured detents 30 which extend inwardly of casing 10.

Switch means 12 comprises a plurality of resilient switch arms 32, 34 which are shown in FIG. 1 as being pivotally anchored at one end in suitable recesses which may be molded as an integral part of base portion 20. Switch arms 32, 34 carry suitable electric contacts near their free ends which are cooperable with a plurality of stationary contacts 36, 38 which may be molded as an integral part of base 20 as shown in FIG. 1 so that a portion thereof extends inwardly and outwardly of the casing 10. Switch arms 32, 34 are operable, with a rocking motion, in a manner to be described hereinafter, about the pivoted ends thereof in a plane substantially parallel to and spaced from the plane of base portion 20 between a plurality of positions relative to contacts 36, 38 to control a heating circuit such as a "broil" and a "bake" element which are indicated schematically in FIGS. 9 through 12 as 40, 42, respectively.

Heating elements 40, 42 may be energized from a suitable source of electric power such as a three-wire source of 110/220 volt 60 cycle alternating current which includes two outside conductors L1, L2 and a neutral conductor N. Heating elements 40, 42 may further be disposed in an oven (not shown) or other heated chamber (not shown), the temperature of which is to be controlled. As indicated in FIGS. 9 through 12, one end of heating elements 40, 42 is connected to switch arms 34, 32, respectively, by conductors 44, 46, respectively. Contacts 38, 36 are connected directly to the conductors N and L1, respectively.

Energizing means 14 is operative to control the energization of the heating circuit comprising "broil" and "bake" elements 40, 42 and is shown rigidly secured to base portion 20 in FIG. 3. Energizing means 14 may take the form of a suitable electric switch such as the one described in my co-pending application, Serial No. 708,497, filed January 13, 1958, which matured as Patent No. 2,929,891, operable between controlling positions by a switch operator 48. For purposes of this description, operator 48 will be considered normally biased upwardly to a switch "closed" position and movable downwardly in a manner to be described hereinafter to a switch "open" position. As shown in FIGS. 9 through 12, energizing means 14 may comprise a pair of stationary contacts connected to the other ends of the "broil" and "bake" elements 40, 42 by wires 50, 52, respectively, and a movable contact connected directly to conductor L2.

A mounting plate 54 provides a rigid means for mounting condition responsive means 16 and control means 18 in an operative relation relative to one another while rendering their relative positions with respect to one another independent of any irregularities that may exist in the surface of top portion 24. As best indicated in FIGS. 2 and 3, mounting plate 54 is secured to apertured detents 30 by a plurality of rivets 56 with the plane surface thereof lying in spaced substantially parallel relationship to the top portion 24. Mounting plate 54 is formed with an aperture 58 disposed coaxially of the aperture 28 and with a pair of downwardly extending parallel spaced ear members 60 having suitable oppositely disposed apertures 62 therein.

A cylindrical hub member 64 having different outer diameters at its opposite ends which define a shoulder portion at their point of juncture, is rigidly disposed in aperture 58 with the shoulder portion thereof engaging the underside of mounting plate 54. Different diameter bores 66, 68 are centrally disposed at opposite ends of hub member 64 and define an angular shoulder portion 70 at their point of juncture. Bore 66 is adapted to receive a threaded stud member 72 which has a transverse slot 74 at the upper end thereof adapted to receive a bladed adjusting instrument, such as a screwdriver. The other or lower end of stud member 72 is formed with an angular surface which may be of the same shape as shoulder portion 70.

Condition responsive means 16 may take the form of a thermostat including an expansible and contractible diaphragm 76 which has a projection 78 and a hydraulic stud 80 extending in opposite directions therefrom. Hydraulic stud 80 and diaphragm 76 are in communication with a capillary tube 82 which extends exteriorly of casing 10 for communication with the usual bulb element 83 which is located in the oven or other heated chamber to be heated by the elements 40, 42. As is well known, condition responsive means 16 contains a liquid or other material which expands upon the bulb 83 being heated and serves to actuate the diaphragm 76 sufficiently to actuate parts hereinafter described.

Hydraulic stud 80 is generally cylindrical in cross-section and is disposed for axial sliding movement in the bore 68 of hub member 64. Hydraulic stud 80 is provided with an angular end portion which abuts the angular end portion of stud 72 and which corresponds in cross-section to that of shoulder portion 70. From FIG. 3, it will be evident that upward travel of hydraulic stud 80 is limited by engagement of the angular end portion thereof with the shoulder 70 of hub 64.

Condition responsive means 16 has an operative connection to energizing means 14 which may take the form of a substantially channel-shaped actuating lever indicated generally at 84. As indicated in FIG. 3, actuating lever 84 comprises a web portion 85, plural upstanding side portions 86, and a pin 88 integrated with side portions 86 at one end thereof with its axis disposed at substantially right angles to the plane of side portions 86. Actuating lever 84 is adapted to be pivoted about pin 88 by condition responsive means 16 and is shown disposed in a substantially horizontal plane with the top surface of web portion 85, intermediate its ends, abutted by projection 78 and with the bottom surface of web portion 85, at the free end thereof, abutting operator 48.

Pin 88 is movable vertically by an overshoot lever, indicated generally at 90 to vary the temperature to which condition responsive means 16 will be responsive. Overshoot lever 90 is shown generally in the form of a channel having plural parallel spaced leg portions 92 and a medial portion 94 disposed upwardly at an acute angle to the plane of leg portions 92. One end of leg portions 92 is suitably apertured and adapted to receive a pin 96, the ends of which are disposed in apertures 62 of the ear members 60. Overshoot lever 90 is adapted to move with a rocking motion about pin 96 so that the free end thereof is caused to move in a substantially vertical plane with an oscillatory movement. The free end of lever 90 is formed with suitable detents 98 in the top edge of leg portions 92 which are adapted to receive pin 88 of actuating lever 84 for pivotal movement therein.

Control means 18 takes the form of a plurality of more or less centrally apertured cam members 102, 104 which have peripheral cam surfaces 106, 108, respectively. Cam members 102, 104 are disposed one above the other intermediate mounting plate 54 and top portion 24 with the central apertures thereof disposed about the reduced diameter portion of hub member 64 for rotary movement thereabout.

As best shown in FIGS. 4 through 7, cam member 102 is formed with a plurality of radially disposed gripping slots 110 and a centering opening 112. Cam member 104 is formed with a plurality of radially disposed gripping lugs 114 and an indexing pin 116 extending from one surface thereof. Gripping lugs 114, it will be noted in FIG. 5, may best be formed to provide a detented portion corresponding thereto in the opposite surface of cam member 104. Gripping slots 110 and indexing opening 112 are adapted to receive gripping lugs 114 and indexing pin 116 respectively thereby operatively engaging cam members 102 and 104 relative to one another for simultaneous rotary movement about hub 64.

Means bias cam member 104 into operative engagement with cam member 102 and take the form of a gripping member 118 which may be formed from spring steel with a central aperture 120 and a plurality of radial downwardly extending leg members 122. Gripping member 118 is disposed intermediate top portion 24 and the top surface of cam members 104 with the central aperture 120 disposed coaxially of aperture 28 and with the free end portions of leg members 122 engaging the detents in cam member 104 corresponding to gripping lugs 114.

Cam members 102, 104 and gripping member 118 are rotatable in either the clockwise or counterclockwise directions as a unit to an infinite number of positions by a rotatable member 124 which takes the form of an elongated shaft having a longitudinal bore therein. One end of shaft 124 is disposed in aperture 28 and rigidly secured to gripping member 118 coaxially of the aperture 120. The other end of shaft 124 is adapted to receive a manually rotatable dial 126 which is adapted to rotate the shaft 124. As shown in FIG. 8, dial 126 has a plurality of control indicia marked thereon which correspond to an "off" position, a "broil" position, a plurality of "baking" positions, and a plurality of "rotisserie" positions. An externally threaded mounting means 127 is rigidly secured to the top surface of top portion 24 coaxially of shaft 124 and adapted to receive a mounting nut (not shown).

Cam member 102, which is shown in FIGS. 1 through 3 as the lower cam member, has an operative connection to condition responsive means 16 which takes the form of a cam follower 128 disposed for rocking movement about pin 96. Cam follower 128 is formed generally with an upstanding portion 130 which is adapted to slide on cam surface 106, a pair of inwardly and downwardly extending leg members which are suitably apertured to receive pin 96, and an aperture 132 located intermediate the upstanding portion 130 and the leg members thereof.

Cam follower 128 is operatively connected to overshoot lever 90 by a generally U-shaped overshoot retaining pin 134. Pin 134 is disposed in a plane generally perpendicular to the plane of cam follower 128 with the closed end thereof extending through aperture 132 operatively engaging suitable apertures provided in medial or web portion 94 of overshoot lever 90. Disposed about the open end of pin 134 is a compression spring 136, one end of which abuts a surface of cam follower 128 and the other end of which is operatively connected to pin 134 by suitably upturning the end portions of pin 134 as best indicated in FIGS. 1 through 3.

It will be evident from FIG. 3 that spring 136 functions to bias upstanding portion 130 of cam follower 128 into engagement with the cam surface 106 of cam member 102 thereby tending to cause movement of cam follower 128 in a counterclockwise direction about pin 96. Spring 136 further biases the free end portion of web portion 94 into engagement with the left-hand side of cam follower 128, thereby tending to rotate overshoot lever 90 in a clockwise direction about pin 96. Clockwise rotation of overshoot lever 90, it will be evident, causes pin 88 of actuating lever 84 to move upwardly thereby abutting the upper and lower surfaces of web portion 85 with actuating member 78 and operator 48, respectively. With web portion 85 abutting operator 48, it will further be apparent that hydraulic stud 80 is kept biased into engagement with the angularly formed end of adjusting screw 72.

Cam member 104, which is shown as the upper cam in FIGS. 1 through 3, has an operative connection to switch means 12 which takes the form of a somewhat C-shaped cam follower 138 disposed in substantially the same plane as cam member 104 intermediate mounting plate 54 and top portion 24. An extension 140 located intermediate the ends of cam follower 138 is adapted to slide on cam surface 108. One end of cam follower 138 is operatively connected to mounting plate 54 by a pivot pin 142 and the other end thereof extends downwardly at substantially right angles to the normal plane of cam follower 138 and has a tongue 144 formed thereat. Switch means 12 are operatively connected to cam follower 138 by an insulating board 146 shown formed with a plurality of grooves 148 at one end thereof and a recess 150 intermediate the ends thereof adapted to receive the tongue 144 of cam follower 138. Insulating board 146 is disposed substantially parallel to the downwardly extending portion of cam follower 138 with one end thereof secured thereto by suitable means such as a machine screw 152 and with the grooves 148 receiving the free end portions of switch arms 32, 34. The resilient characteristics of switch arms 32, 34 are such as to cause pivotal movement of cam follower 138 about pin 142 in the counterclockwise direction as viewed in FIG. 2 thereby biasing the extension 140 into engagement with the cam surface 108.

The switch thus far described may be mounted behind the backsplash panel (not shown) of a conventional domestic cooking range (not shown) with shaft 124 and mounting means 127 extending outwardly therefrom through a suitable aperture (not shown) which may be provided therein. A nut (not shown) threaded onto mounting means 127 will positively secure the switch in an operative position on the backsplash panel and the dial 126 can now be suitably placed on the shaft 124 for rotating same.

In the operation of this switch, bulb 83 will be disposed in the oven or other heated chamber along with the broil and bake elements 40, 42. Switch means 12 and energizing means 14 will be operatively connected intermediate the source of electric current L1, L2, N and the broil and bake elements 40, 42 by the plurality of conductors 44, 46, 50, and 52 to provide the circuit shown generally in FIGS. 9 through 12.

Dial 126 can be rotated in either the clockwise or the counterclockwise directions through an infinite number of degrees and when thus rotated, cam members 102, 104 will be simultaneously rotated therewith through a correspondingly angular movement. With cam follower 138 being biased into engagement with cam surface 108 of cam member 104 by the bias of switch arms 32, 34, it will accordingly rock about pin 142 in a manner which will be determined by the general configuration of cam surface 108. Rocking movement of cam follower 138 causes movement of insulating board 146 transverse of the length of switch arms 32, 34 and accordingly simultaneous movements of switch arms 32, 34 about their pivot points relative to the stationary contacts 36, 38. The configuration of cam surface 108 is subject to an infinite variety of variations, and it should be evident that for every angular position of cam member 104, any desirable position of switch arms 32, 34 relative to stationary contacts 36, 38 is obtainable. It should be further evident that additional switch arms and stationary contacts can be operated by cam follower 138 to control additional heating elements than those described herein.

For purposes of this description, with dial 126 in the "off" position, switch arms 32, 34 will be considered to assume the position shown schematically in FIG. 9 wherein switch arms 32, 34 do not engage either of the stationary contacts 36, 38 thereby disconnecting elements 40, 42 from either of the conductors N or L1. With the dial 126 set to any of the plurality of bake indicia, switch arms 32, 34 will assume the position shown schematically in FIG. 10 with switch arm 34 engaging stationary contact 38 and switch arm 32 engaging stationary contact 36. A position whereby switch arm 34 engages stationary contact 38 and switch arm 32 disengages contact 36 is available when dial 126 is rotated to any of the "rotisserie" indicia as shown schematically in FIG. 11 and when dial 126 is in the "broil" position, switch arm 34 engages contact 36 as shown schematically in FIG. 12.

Overshoot spring 136 biases the extension 130 of cam follower 128 into engagement with the cam surface 106 of cam member 102 as explained heretofore. Consequently, rotation of cam member 102 causes rocking movement of cam follower 128 about pin 96 as determined by the general configuration of cam surface 106. The rocking movement of cam follower 128 is transmitted to overshoot lever 90 by spring 136 and overshoot pin 134 with resultant corresponding rocking movement of overshoot lever 90 which causes vertical oscillatory movement of the detents 98 and a vertical oscillatory movement of the pin 88 of actuating lever 84. It will be apparent that with bulb 83 subjected to a constant temperature that the projection 78 of condition responsive means 16 will assume a relatively fixed position and with stud 80 abutting against the angular end portion of stud 72, the condition responsive means 16 will not be moved axially by actuator 84 in response to oscillatory vertical movement of pin 88. Instead, with projection 78 in a fixed position, vertical oscillatory movement of pin 88 will cause axial movement of operator 48 in an amount proportional to that in which pin 88 is moved and in a direction opposite to the direction of movement thereof. It will be made apparent that movement of pin 88, with resultant movement of actuating lever 84 relative to operator 48, varies the distance through which projection 78 must move to actuate energizing means 14 between control positions and accordingly the temperature to which condition responsive means 16 is responsive.

Since the configuration of cam surface 106 is subject to an infinite number of variations, it should be evident that for every angular position of cam member 104 any desired position of operator 48 relative to projection 78 is obtainable. Accordingly, condition responsive means 16 can be caused to actuate energizing means 14 between controlling positions at any desired temperature within the limitations of its operating range, at any particular angular position of cam member 104.

For purposes of this description, with the dial 126 in the "off" position, the pin 88 of actuating lever 84 will be assumed to be in its uppermost position, as viewed in FIG. 3, whereby operator 48 will assume its lowest normal position which corresponds to the switch-open position of energizing means 14 as indicated schematically in FIG. 9. As dial 126 is rotated in the counterclockwise direction from the "off" position, it is first moved to the "broil" position which corresponds to the lowermost position of pin 88 and the uppermost position of operator 48 corresponding to the switch-closed position of energizing means 14. Subsequent counterclockwise rotation of dial 126 through the "bake" indicia ranging from 550° F. through 200° F. causes movement of pin 88 upwardly from the position it assumed in the "broil" position of dial 126 thereby causing operator 48 to move downwardly from its uppermost position assumed in the "broil" position of dial 126. Operator 48 is, however, not depressed sufficiently even at the 200° F. indicia of dial 126 to maintain energizing means 14 in the open position.

Further counterclockwise rotation of dial 126 from the 200° F. indicia thereof to any of the "rotisserie" indicia marked as "High," "Low," or "Medium" causes downward movement of the pin 88 from the position it assumes at the 200° F. "bake" position and corresponding upward movement of the operator 48 of energizing means 14. In the "Low," "Medium," and "High" indicia of the "rotisserie" positions of dial 126, pin 88 and operator 48 may be moved to the same positions they would assume if the dial 126 were set to the "bake" indicia 250° F., 350° F., and 450° F., respectively.

With dial 126 in the "off" position, as explained heretofore, broil and bake elements 40 and 42 are disconnected from the source of electric power L1, L2, N by the switch means 12 and the energizing means 14. When dial 126 is thereafter rotated in either the clockwise or the counterclockwise direction to the "broil" position, cam members 102, 104 are simultaneously rotated therewith in a corresponding direction through a corresponding number of degrees of angular movement. In the "broil" position of the dial 126 as explained heretofore, switch arm 34 engages stationary contact 36 and pin 88 of actuating lever 84 is caused to move to its lowermost position allowing operator 48 to raise and actuate energizing means 14 to a switch-closed position to establish the circuit of FIG. 12. The broil element 40 is now energized by 220 volts through a circuit which may be traced from conductor L1, through stationary contact 36, switch arm 34, wire 44, broil element 40, wire 50, energizing means 14 to conductor L2. Broil element 40 commences to heat the oven or other heated chamber raising the temperature in the same and causing the expansible liquid of condition responsive means 16 to expand as temperature rise is detected by bulb 83. Expansion of the liquid in condition responsive means 16 causes downward axial movement of projection 78 with resultant counterclockwise rotation of actuator 84 about pin 88.

When the temperature of the oven or other heated chamber corresponds to the usual broiling temperature as set by dial 126, the expansible liquid in condition responsive means 16 will have been expanded sufficiently to cause projection 78 to have moved downwardly in an amount sufficient to cause actuator 48 to move energizing means 14 to a switch-open position. As is evident from FIG. 12, upon the opening of energizing means 14, wire 50 is disconnected from conductor L2 and the broil element 40 is deenergized thereby allowing the oven or other heated chamber to cool.

As the temperature sensed by bulb 83 decreases, projection 78 of condition responsive means 16 will move axially upward thereby allowing actuating lever 84 to rotate in a clockwise direction about pin 88 until operator 48 of energizing means 14 is moved upwardly sufficiently to move to a switch-closed position thereby re-energizing broil element 40. Energizing means 14 will be moved between switch-open and switch-closed positions by the condition responsive means 16 so long as dial 126 remains in the broil position to maintain the preselected broiling temperature. When it is desired to terminate this operation, the dial 126 is merely rotated in either the clockwise or the counterclockwise direction to the "off" position and the switch means 12 and the energizing means 14 will resume the positions indicated in FIG. 9 thereby disconnecting the broil element 40 from the source of electric current.

When the dial 126 is rotated to any of the bake indicia corresponding to 200° F. to 550° F., cam members 102, 104 are simultaneously rotated therewith in a corresponding direction through a corresponding angular movement as explained heretofore. Switch arm 34 engages stationary contact 38, switch arm 32 engages stationary contact 36, and pin 88 of actuating lever 84 and operator 48 are moved to a point which corresponds to the pre-selected temperature as set by dial 126. In this condition, the broil element 40 is energized from 110 volts through a circuit which may be traced from conductor N, through contact 38, switch arm 34, wire 44, broil element 40, wire 50, energizing means 14 to conductor L2 and bake element 42 is energized from 220 volts through a circuit traced from conductor L1 through contact 36, switch arm 32, wire 46, bake element 42, wire 52, energizing means 14 to conductor L2.

As explained heretofore with respect to the broil operation, as the oven or other heated chamber is heated by the broil and bake elements 40, 42, the temperature thereof will rise causing downward axial movement of the projection 78 of condition responsive means 16 and the eventual opening of energizing means 14. The broil and bake elements 40, 42 will be simultaneously cycled between energized and de-energized conditions in response to axial movement of the projection 78 of condition responsive means 16 to maintain the preselected temperature as determined by dial 126. This operation can be terminated by simply rotating dial 126 in either the clockwise or counterclockwise directions to the "off" position to have switch means 12 and energizing means 14 resume the position disconnecting broil and bake elements 40, 42 from the source of electric power as indicated in FIG. 9.

To perform a rotisserie operation, the dial 126 is rotated in either the clockwise or counterclockwise direction to one of the "rotisserie" indicia corresponding to "High," "Low," or "Medium" heat. Simultaneously therewith cam members 102, 104 are rotated and cause switch arm 34 to engage contact 36, switch arm 32 to disengage contact 36, and the pin 88 of actuating lever 84 and the operator 48 of energizing means 14 to assume positions which correspond in temperature to that of either the "High," "Low," or "Medium" rotisserie indicia. The broil element 40, in the "rotisserie" position is connected across 110 volts through a circuit which may be traced from the conductor N through stationary contact 36, switch arm 34, wire 44, broil element 40, wire 50, energizing means 14 to conductor L2.

Again, energizing means 14 is cycled between switch-open and switch-closed positions by axial movement of the projection 78 of condition responsive means 16 to maintain the temperature which has been preselected by dial 126 until such time as operation is terminated by moving the dial 126 to the "off" position to establish the circuit of FIG. 9.

Since the configuration of cam surfaces 106, 108 are each subject to an infinite variety of variations, it will be readily apparent that by changing the configuration of both cam surfaces 106 and 108 that any desired position of switch arms 32, 34 relative to stationary contacts 36, 38, and any desired position of operator 48 relative to projection 78 can be obtained for any particular angular position of dial 126. Accordingly, dial 126 is subject to an unlimited variety of variations and the example thereof shown in FIG. 8 is considered merely illustrative of one dial which may be utilized with the switch of this invention.

The construction of the switch of the present invention renders it simple to calibrate and further renders the calibration thereof positive and unaffected by either movement of dial 126 or irregularities which may be present in the structure of casing 10. The positiveness of calibration is brought about largely by the fact that condition responsive means 16 and controlling means 18 are mounted independently of the casing structure 10 on the rigid mounted plate 54 and the fact that there is a resilient connection in the form of gripping member 118 between the cam members 102, 104 and the control shaft 124.

When the switch of this invention is assembled as indicated in FIGS. 1–3, the switch means 12 may be calibrated by simply rotating cam 104 to any preselected position such as the "off" position, manually engaging projection 140 of cam follower 138 with the cam surface 108 at the preselected point which corresponds to the "off" position of the switch means, loosening the machine screw 152, moving insulating board 146 transverse of the length of switch arms 32, 34 causing movement of switch arms 32, 34 therewith to the position that they should assume relative to contacts 36, 38, and thereafter tightening machine screw 152.

Calibration of condition responsive means 16 is accomplished by removing dial 126 from shaft 124 and inserting a bladed tool in the aperture of shaft 124 to engage slot 74 of threaded stud 72. Rotation of the adjusting blade in a manner to cause downward movement of stud 72 results in corresponding downward movement of condition responsive means 16 and opposite movement of stud 72 results in the corresponding opposite movement of condition responsive means 16. The calibration of condition responsive means 16 is lowered by moving projection 78 thereof downwardly and is raised by moving projection 78 thereof in the upward direction.

The overshoot lever 90, the overshoot spring 136, and the overshoot pin 134 provide means to prevent injury to the switch parts of the switch of the present invention. As best illustrated in FIG. 3, assume that all switch parts are in the position shown, that the oven or other heated chamber is being heated by the broil and bake elements 40, 42, and that the operator 48 has just been depressed by actuator 84 to the switch open position of energizing means 14.

If, thereafter, projection 78 of condition responsive means 16 continues to move downwardly, actuator 84 will pivot about operator 48 causing pin 88 thereof to move downwardly causing counterclockwise rotation of overshoot lever 90 about pin 96. Since cam follower 128 cannot rotate in the counterclockwise direction because extension 130 thereof engages cam surface 106, counterclockwise rotation of overshoot lever 90 results in compression of spring 136. Thereafter, when projection 78 of condition responsive means 16 moves upwardly overshoot lever 90 will resume its normal position biased into engagement with cam follower 128 and the pin 88 of actuating lever 84 will resume the normal position as determined by the position of overshoot lever 90.

It is evident that this arrangement of the overshoot lever 90, the overshoot spring 136 and the overshoot pin 134 eliminates the occurrence of any damage which might otherwise result to either the actuator 84, the energizing means 14, or the condition responsive means 16 upon excessive movement of projection 78 of condition responsive means 16.

Although only one modification of the invention has been shown and described herein, it will be readily apparent to those skilled in the art that many modifications of this invention may be made without departing from the scope thereof which is to be measured by the appended claims.

I claim:
1. In a control device for electrically heated appliances, the combination comprising switch means movable between a plurality of positions for controlling a heating circuit, energizing means operable between open and closed positions for connecting said switch means to a source of electrical power, condition responsive means adjustable through a range of predetermined conditions for operating said energizing means between open and closed positions in response to variations in any of said predetermined conditions, rotatable control means having a plurality of cam surfaces thereon, a first pivoted member for moving said switch means between said plurality of positions and arranged to be operated by one of the cam surfaces on said control means, and a second pivoted member for adjusting said condition responsive means through a range of predetermined temperatures and arranged to be operated by another cam surface on said control means.

2. In a control device for electrically heated appliances, the combination comprising switch means movable between a plurality of positions for controlling a heating circuit, energizing means operable between open and closed positions for connecting said switch means to a source of electrical power, temperature responsive means movable in response to temperature variations, an actuator arranged for movement about a pivot by movement of said temperature responsive means for operating said energizing means between open and closed positions, a first rotatable control member having a peripheral cam surface thereon, a first pivotally mounted cam follower means for moving said switch means between said plurality of positions and arranged for operation by the cam surface of said first control member, a second rotatable control member operatively connected to said first rotatable control member for simultaneous rotation therewith and having a peripheral cam surface thereon, a second pivotally mounted cam follower means arranged for operation by the cam surface of said second control means for moving the pivot of said actuator, and means rotatable in two directions to an infinite number of positions for simultaneously rotating said first and second rotatable members.

3. The combination recited in claim 2 wherein additional means are operatively associated with said temperature responsive means for moving said temperature responsive means independently of any temperature variations.

4. In a control device for electrically heated appliances, the combination comprising a casing, energizing means disposed in said casing and operable between controlling position for connecting a heating means to a source of electric power, a thermostat disposed in said casing and including a member movable axially in response to temperature variations in a range of predetermined temperatures to be controlled, means movable about a pivot by the movable member of said thermostat to actuate said energizing means between controlling positions, a rotatable control member disposed in said casing and having a cam surface thereon, a fixed pivot in said casing, a cam follower arranged for rocking movement about said pivot by the cam surface of said control, and a lever arranged for rocking movement about said pivot by said cam follower for moving the pivot of said movable means to predetermine the temperature in the range to which said thermostat is responsive.

5. In a control device for electrically heated appliances, the combination comprising energizing means operable between controlling positions for connecting a heating means to a source of electrical power, a thermostat movable in response to temperature variations in a range of predetermined temperatures to be controlled, a pivoted member actuated by movement of said thermostat for moving said energizing means between controlling positions, an apertured rotatable control member having a cam surface thereon, a pivoted cam follower arranged to be operated by the cam surface of said control member for moving said pivoted member independently of said thermostat and said energizing means to predetermine the temperature in the range to which said thermostat will be responsive, and means disposed in the aperture of said control member in engagement with said thermostat and being operative independently of said rotatable control member for adjusting said thermostat.

6. In a control device connecting a plurality of heating means to a source of electric power for determining a range of temperatures, the combination comprising a casing, an aperture in said casing, a thermostat disposed within said casing including means movable axially in response to temperature variations, a rotatable control member movable to an infinite number of positions extending through said aperture of said casing, a peripheral cam surface secured to said control member and located intermediate said casing and said thermostat, switch means including a plurality of resilient switch arms movable between a plurality of positions, an elongated cam follower pivoted to engage said peripheral cam surface of said control member, the outer end of said cam follower being connected to said switch arms, the intermediate portion of said cam follower being biased into engagement with the peripheral cam surface by said resilient switch arms, and energizing means operable between controlling positions for connecting the heating means to a source of electric power, said thermostat being operatively connected to said energizing means for moving said energizing means between controlling positions, said switch means being electrically connected to said energizing means in its energized position, and said cam follower being operable by said cam surface on said control member for moving said switch means between said plurality of controlling positions whereby said switch means determines the heating means energized by the energizing means to obtain a particular temperature range.

7. In a control device for electrically heated appliances, the combination comprising a casing, switch means in said casing movable between a plurality of positions for controlling heating circuit means, energizing means movable between controlling positions for connecting said switch means to a source of electrical power, thermally responsive means for moving said energizing means between controlling positions in response to variations from preselected temperature positions, and control means operatively connected to said switch means and to said thermally responsive means for simultaneously moving said switch means to a controlling position and said thermally responsive means to a preselected temperature position, said control means being movable from an off position to an infinite number of controlling positions and being rotatably carried by said casing for rotation in either direction from its off position to a selected controlling position.

8. The combination as recited in claim 7 wherein said control means includes a rotatable dial knob, and wherein cooperating indicia on said dial knob and said casing indicate the controlling positions of said dial knob, said cooperating indicia having broil rotisserie positions with an off position therebetween, and said dial knob being movable from its off position by rotation in either direction to its broil and rotisserie positions.

References Cited in the file of this patent

UNITED STATES PATENTS

| 2,276,930 | Clark | Mar. 17, 1942 |
| 2,409,434 | Jacobs | Oct. 15, 1946 |
| 2,541,314 | Weber et al. | Feb. 13, 1951 |
| 2,647,962 | Batcheller | Aug. 4, 1953 |
| 2,758,190 | Raney | Aug. 7, 1956 |
| 2,765,375 | Pearce et al. | Oct. 2, 1956 |
| 2,774,849 | Weber et al. | Dec. 18, 1956 |
| 2,816,998 | Fry et al. | Dec. 17, 1957 |
| 2,824,941 | Fry | Feb. 25, 1958 |